United States Patent
Chen (10) Patent No.: US 9,622,278 B2
(45) Date of Patent: Apr. 11, 2017

(54) DUAL-MODE WIRELESS NETWORKED DEVICE INTERFACE AND AUTOMATIC CONFIGURATION THEREOF

(75) Inventor: Ben Wei Chen, Santa Ana, CA (US)

(73) Assignee: KINGSTON DIGITAL INC., Fountain Valley, CA (US)

(*) Notice: Subject to any disclaimer, the term of this patent is extended or adjusted under 35 U.S.C. 154(b) by 269 days.

(21) Appl. No.: 12/912,614

(22) Filed: Oct. 26, 2010

(65) Prior Publication Data
US 2012/0102106 A1 Apr. 26, 2012

(51) Int. Cl.
- G06F 15/16 (2006.01)
- H04W 76/02 (2009.01)
- H04L 29/12 (2006.01)
- H04W 84/18 (2009.01)

(52) U.S. Cl.
CPC ..... H04W 76/023 (2013.01); H04L 29/12226 (2013.01); H04L 61/2015 (2013.01); H04W 84/18 (2013.01)

(58) Field of Classification Search
CPC .............. H04L 45/16; H04L 29/12226; H04L 61/2015; H04W 76/023; H04W 84/18
USPC ....................................................... 709/204
See application file for complete search history.

(56) References Cited

U.S. PATENT DOCUMENTS

| | | | |
|---|---|---|---|
| 5,408,618 A | 4/1995 | Aho et al. | |
| 6,438,594 B1 | 8/2002 | Bowman-Amuah | |
| 6,563,515 B1 | 5/2003 | Reynolds et al. | |
| 6,779,004 B1 | 8/2004 | Zintel | |
| 6,954,790 B2 | 10/2005 | Forslow | |
| 6,978,314 B2 | 12/2005 | Tarr | |
| 6,981,041 B2 | 12/2005 | Araujo et al. | |
| 7,068,680 B1 | 6/2006 | Kaltenmark et al. | |

(Continued)

FOREIGN PATENT DOCUMENTS

| | | |
|---|---|---|
| GB | 2341523 A | 3/2000 |
| WO | WO2011133908 | 10/2011 |

OTHER PUBLICATIONS

Rue Liu, "Iomega Home Media Hard Drive Cloud Edition Review—SlashGear", Jun. 2011, SlashGear, http://www.slashgear.com/iomega-home-media-hard-drive-cloud-edition-review-14156840/.

(Continued)

Primary Examiner — June Sison
Assistant Examiner — Steven Nguyen
(74) Attorney, Agent, or Firm — Brundidge & Stanger, P.C.

(57) ABSTRACT

A wireless networked device interface is disclosed. The wireless networked device interface comprises a central processing unit (CPU), a bus coupled to the CPU, a memory/buffer coupled to the bus, a peripheral bus interface coupled to the bus, an upstream network module coupled to the bus, a downstream network module coupled to the bus and a peripheral device. The device interface includes a nonvolatile memory (NVM) coupled to the bus. The NVM includes a configuration function which through a portable device can associate with one or more portable devices on the downstream wireless network and associate with one or more access points on the upstream wireless network. The wireless networked device as well as the access point can be discovered, selected and auto-configured through the graphic user interface of one of the portable devices on the downstream wireless network.

13 Claims, 9 Drawing Sheets

(56) References Cited

U.S. PATENT DOCUMENTS

| | | | |
|---|---|---|---|
| 7,120,429 B2 | 10/2006 | Minear et al. | |
| 7,219,140 B2 | 5/2007 | Marl et al. | |
| 7,293,077 B1 | 11/2007 | Teo et al. | |
| 7,328,256 B2 | 2/2008 | Taoyama et al. | |
| 7,392,034 B2 | 6/2008 | Westman et al. | |
| 7,408,882 B2 | 8/2008 | Abdo et al. | |
| 7,467,198 B2 | 12/2008 | Goodman et al. | |
| 7,487,230 B2 | 2/2009 | Gu et al. | |
| 7,558,846 B2 | 7/2009 | Gu et al. | |
| 7,562,393 B2 | 7/2009 | Buddhikot et al. | |
| 7,602,756 B2 | 10/2009 | Gu et al. | |
| 7,627,653 B2 | 12/2009 | Taoyama et al. | |
| 7,630,341 B2 | 12/2009 | Buddhikot et al. | |
| 7,636,764 B1 | 12/2009 | Fein et al. | |
| 7,640,340 B1 | 12/2009 | Stapp et al. | |
| 7,640,546 B2* | 12/2009 | Zarenin et al. | 718/102 |
| 7,647,203 B1 | 1/2010 | Herz | |
| 7,676,690 B2 | 3/2010 | Bucher et al. | |
| 7,788,656 B2 | 8/2010 | Harper | |
| 7,810,148 B2 | 10/2010 | Bed-Shacher et al. | |
| 7,978,714 B2 | 7/2011 | Rao et al. | |
| 8,045,000 B2 | 10/2011 | Davidson et al. | |
| 8,069,217 B2 | 11/2011 | Lo et al. | |
| 8,170,209 B2 | 5/2012 | Peng et al. | |
| 8,300,056 B2 | 10/2012 | Nugent et al. | |
| 8,412,798 B1 | 4/2013 | Wang | |
| 2004/0223469 A1* | 11/2004 | Bahl et al. | 370/331 |
| 2005/0102529 A1* | 5/2005 | Buddhikot et al. | 713/200 |
| 2005/0286476 A1* | 12/2005 | Crosswy et al. | 370/338 |
| 2006/0271968 A1 | 11/2006 | Zellner | |
| 2006/0291434 A1* | 12/2006 | Gu et al. | 370/338 |
| 2007/0165579 A1 | 7/2007 | Delibie et al. | |
| 2007/0294368 A1 | 12/2007 | Bomgaars et al. | |
| 2008/0016491 A1 | 1/2008 | Doepke | |
| 2008/0019333 A1* | 1/2008 | Kharia et al. | 370/338 |
| 2008/0162698 A1 | 7/2008 | Hopen et al. | |
| 2008/0201751 A1 | 8/2008 | Ahmed et al. | |
| 2008/0301794 A1 | 12/2008 | Lee | |
| 2009/0019492 A1 | 1/2009 | Grasset | |
| 2009/0106394 A1 | 4/2009 | Lin et al. | |
| 2009/0129301 A1* | 5/2009 | Belimpasakis | H04W 28/18 370/310 |
| 2009/0303973 A1 | 12/2009 | Patil | |
| 2010/0036955 A1 | 2/2010 | Hopen et al. | |
| 2010/0188987 A1 | 7/2010 | Azimi et al. | |
| 2011/0107379 A1 | 5/2011 | Lajoie et al. | |
| 2011/0145418 A1 | 6/2011 | Pratt et al. | |
| 2011/0145821 A1 | 6/2011 | Philipson et al. | |
| 2012/0081382 A1 | 4/2012 | Lindahl et al. | |
| 2012/0084798 A1 | 4/2012 | Reeves et al. | |
| 2012/0236796 A1 | 9/2012 | Lazaridis et al. | |
| 2012/0307141 A1 | 12/2012 | Millet et al. | |
| 2012/0311329 A1 | 12/2012 | Medina et al. | |
| 2013/0024545 A1 | 1/2013 | Sheppard et al. | |
| 2013/0067550 A1 | 3/2013 | Chen et al. | |
| 2013/0177891 A1 | 7/2013 | Hammerschmidt | |
| 2013/0231146 A1 | 9/2013 | Mathias et al. | |
| 2014/0141721 A1 | 5/2014 | Kim et al. | |
| 2014/0306865 A1 | 10/2014 | Pan et al. | |
| 2014/0359477 A1 | 12/2014 | Chen | |
| 2015/0327313 A1 | 11/2015 | Kim et al. | |

OTHER PUBLICATIONS

Ellison, Craig (Mar. 29, 2011) "Iomega Home Media Network Hard Drive—Cloud Edition Reviewed" SmallCloudBuilder.com http://www.smallcloudbuilder.com/storage/reviews/311-iomega-home-media-network-hard-drive-cloud-edition-reviewed.

Malik, Om (May 22, 2009) "How Pogoplug Works" gigaom.com http://gigaom.com/2009/05/22/how-pogoplug-works/.

Mldonkey (Oct. 5, 2010) "WhatFirewallPortsToOpen" mldonkey.sourceforge.net http://mldonkey.sourceforge.net/WhatFirewallPortsToOpen.

McDowell, Guy (Oct. 10, 2009) "How does a Router Work? [Technology Explained]" makeuseof.com http://www.makeuseof.com/tag/technology-explained-how-does-a-router-work/.

Use Yahoo Messenger for a Video or Audio Conference, Mar. 2005, http://education.ucf.edu/techfac/docs/videochattutorial.pdf.

filename "Sep. 2012 WiFi-Miracast brochure.pdf" Miracast-paper: "Wi-Fi Certified MiracastTM: Extending the Wi-Fi experience to seamless video display" published by Wi-Fi Alliance on Sep. 19, 2012.

filename: "WiFi Miracast Demo video—Screenshots and Transcript.pdf" Screenshots and Transcripts of "Wi-Fi Certified MiracastTM Demo at 2013 CES" video https://www.youtube.com/watch?v=cYagdOp9y7E published by Wi-Fi Alliance on Jan 9, 2013.

filename: "Jul. 2011—Samsung Remote App.pdf" Samsung App Profile: Remote App published published online on Jul. 30, 2011.

filename: "Mar. 2013—panasonic-my-home-screen-smart-tv.pdf" "Panasonic My Home Screen Smart TV Interface" published online on Mar. 6, 2013.

filename: "Jul. 2012—samsung-tv-remote-app" "Samsung TV Remote app not working for some 2012" online article published on Jul. 18, 2012.

\* cited by examiner

DUAL-MODE WIRELESS NETWORKED DEVICE INTERFACE AND AUTOMATIC CONFIGURATION THEREOF

FIELD OF THE INVENTION

A method and system in accordance with the present invention relates generally to networks and more specifically to wireless networked devices.

BACKGROUND OF THE INVENTION

Configuration of wireless devices is important when they are trying to communicate in a wireless network. Conventional wireless networks allow a wireless networked device connect only through peer-to-peer mode to a portable device. This is typically accomplished through the association of the IP addresses of the respective devices. Due to the wireless nature of a networked peripheral device, it is very difficult to associate the IP addresses and/or the ID between a wireless networked device and a portable device. There usually is a pre-defined ID for the wireless networked device to be discovered by the portable device. After the wireless networked device ID is discovered and selected by the portable device, the IP addresses of the two devices have to be assigned in order for them to communicate through IP network. The discovery and selection process of the ID is usually accomplished through the graphical user interface (GUI) of the portable device. The IP address assignment process is also accomplished through the same GUI on the portable device. The user has to manually assign two IP addresses for both devices. Even though the process is provided by utilizing the GUI, it is still very cumbersome.

Traditionally, by limiting to just peer-to-peer wireless network mode, the class of portable device (A) is exclusively associated with the wireless networked device and will not be able to access any function or service provided by the upstream wireless access point.

Since wireless networked devices generally lack a graphical user interface (GUI), it is conventionally easier to associate the wireless networked device, as a source, with the portable device, as a destination in the peer-to-peer wireless network mode. The discovery and selection process of the source is typically through the GUI of the portable device. But in the case of the access point network mode where upstream wireless access point is the source and the wireless networked device is the destination, it is virtually impossible to configure the upstream wireless access point for the conventional wireless networked device, as neither device has graphical user interface (GUI) available to the user.

Accordingly, what is needed is a system and method that addresses the above-identified issues. The system and method should be cost effective, easily implementable and readily adaptable to existing environments. The present invention addresses such a need.

SUMMARY OF THE INVENTION

A wireless networked device interface is disclosed. The wireless networked device interface comprises a central processing unit (CPU), a bus coupled to the CPU, a memory/buffer coupled to the bus, a peripheral bus interface coupled to the bus, an upstream network module coupled to the bus, a downstream network module coupled to the bus and a peripheral device. The device interface includes a nonvolatile memory (NVM) coupled to the bus. The NVM includes a configuration function which through a portable device can associate with one or more portable devices on the downstream wireless network and associate with one or more access points on the upstream wireless network. The wireless networked device as well as the access point can be discovered, selected and auto-configured through the graphic user interface of one of the portable devices on the downstream wireless network.

DETAILED DESCRIPTION

A method and system in accordance with the present invention relates generally to networks and more specifically to wireless networked devices. The following description is presented to enable one of ordinary skill in the art to make and use the present invention and is provided in the context of a patent application and its requirements. Various modifications to the preferred embodiments and the generic principles and features described herein will be readily apparent to those skilled in the art. Thus, the present invention is not intended to be limited to the embodiments shown, but is to be accorded the widest scope consistent with the principles and features described herein.

A method and system in accordance with the present invention first associates the wireless networked device with the class of portable device (A) to form a peer-to-peer wireless network utilizing the GUI of the portable device (A). Afterwards, the user can conduct the discovery and selection process for the wireless networked device through the same GUI of the portable device (A) to discover and select one of the available upstream wireless access points in proximity. The association between the access point and the wireless networked device allows the latter to join the access point IP network where the class of other portable devices (B) may have already been members.

A method and system in accordance with the present invention then allows this class of portable devices (B) under the existing access point IP network to access the functions and resources on the wireless networked device without further configuration effort.

Traditionally, by limiting to just peer-to-peer wireless network mode, the class of portable device (A) is exclusively associated with the wireless networked device and won't be able to access any function or service provided by the upstream wireless access point. With a method and system in accordance with the present invention, both peer-to-peer wireless network mode and access point network mode are available to the wireless networked device. One of the benefits of the access point network mode of operation compared with that of peer-to-peer wireless network mode is to allow the class of portable device (A) to enjoy the function and services of the wireless networked device as well as those of the upstream wireless access point, such as Internet access and server functionalities.

In a method and system in accordance with the present invention, both peer-to-peer wireless network mode and access point network mode are available to the wireless networked device. One of the benefits of the access point network mode of operation compared with that of peer-to-peer wireless network mode is to allow the class of portable device (A) to enjoy the function and services of the wireless networked device as well as those of the upstream wireless access point, such as Internet access and server functionalities.

The peer-to-peer wireless network mode and the access point network mode of operation in a method and system in accordance with the present invention can be exclusive or concurrent. The concurrent operation of the two modes on the wireless networked device is the preferred embodiment as it provides the best of both worlds. In the access point network mode, the wireless networked device connects upstream with the access point and provides functions and services to the class of portable device (B) under the same access point IP network. In the mean time in the peer-to-peer wireless network mode, the wireless networked device connects downstream with the class of portable devices (A) and provides functions and services to this class of portable devices (A) under the peer-to-peer wireless network. In the mean time, this class of the portable devices (A) can work upstream through the wireless networked device as a virtual router, to access further upstream through the access point to acquire functions and services offered by the access point.

A method and system in accordance with the present invention relates to the automatic configuration of a dual-mode wireless networked device. As the network enabled portable device such as smart phone, eBook, notebook, netbook, and tablet PC become ubiquitous, the time is ripe for many computing peripheral devices and services to become network enabled and connectable wirelessly. The type of computing peripheral device includes input and output devices such as storage, printer, scanner, display panel, keyboard, mouse, communication, network, video, audio, bus interface and others. It will be beneficial to add a low cost connectivity and network functional module to the peripheral device and yet preserve the original functionality of the peripheral device. The portable device can then through wireless network, conduct discovery, configuration of the peripheral device. The two devices are then associated and bonded by the peer-to-peer networking relationship. The peripheral device is then ready for use by the portable device. Note that peripheral device is in most cases interchangeable with device throughout the text.

After the peripheral device becomes network enabled, how to effortlessly and seamlessly configure and connect it to the network enabled portable device, becomes a big question. The typical nature of the peripheral device is that it lacks a proper user interface for configuration and setup, as in the case of storage, printer, scanner, display panel, keyboard, mouse, video, audio, and bus interface. One of the purposes of a method and system in accordance with the present invention is to allow a portable device to effortlessly and seamlessly configure and connect to a network enabled peripheral device.

It is sometime beneficial to allow a peripheral device to be shared by multiple portable devices. Another purpose of a method and system in accordance with the present invention is to allow the network enabled peripheral device to effortlessly and seamlessly connect to multiple portable devices in a private peer-to-peer wireless network.

A private peer-to-peer wireless network in accordance with in accordance with an embodiment allows for the establishing of a bonded relationship between the peripheral device and the portable device. The bonded relationship works perfectly fine, if the portable device is stationary and not requiring other network services. But in the real world, the portable device is mobile and interacts more in proximity basis with other networked server, such as access point, router, server, or service provider.

As each portable device may only have one available wireless network port and service, this private peer-to-peer wireless network may become a handicap or barrier for it to enjoy both available services simultaneously provided by the networked server and the network enabled peripheral device. It is therefore, another purpose of this invention to add another mode of operation to the wireless networked device in addition to the above mentioned private peer-to-peer wireless network mode.

The second mode of operation allows the wireless networked device to be able to join in the pre-existing network in proximity of the portable device. The mode is therefore referred to as the access point network mode. During this mode, the proximity network upstream wireless access point serves both the portable device as well as the wireless networked device and other networked devices. The portable device can also be configured effortlessly and seamlessly with the constraints of an on-device graphical user interface (GUI).

A method and system in accordance with the present invention therefore describes a dual-mode wireless networked device that functions either in peer-to-peer network mode or in access point network mode. Once it is initially configured, the wireless networked device is associated with the portable device in peer-to-peer network mode.

If, later in proximity, there is an upstream wireless access point exists, such as a wireless router or network gateway, then the wireless networked device is able to join along with the portable device into the wireless network under the upstream wireless access point. The association between the portable device and the wireless networked device is no longer a peer-to-peer relationship. Instead, the two devices are associated through the upstream wireless access point in proximity. The wireless networked device is at this time running in access point network mode.

Furthermore, a method and system in accordance with the present invention implements a Dynamic Host configuration Protocol (DHCP) server on the wireless networked device. It has the advantage of automatically assigning an IP address to the portable device that has discovered and selected the wireless networked device. It therefore achieves auto-configuration functionality to simplify manual configuration process. With the built-in DHCP server, it further allows the wireless networked device to effortlessly and seamlessly connect to multiple portable devices in a private peer-to-peer wireless network.

Most wireless networked devices can only function either in a peer-to-peer IP network or an access point IP network, but not in both. The reason is that in case of peer-to-peer IP network, the wireless networked device behaves as an IP server to provide IP address to the portable devices. While in the case of the access point IP network, the wireless networked device behaves as a client to accept allocated IP address from the upstream wireless access point DHCP server.

This type of dual mode or dual personality can be done through automatic configuration in the wired IP network, as there is no ambiguity on the source and destination of the IP address provider and receiver. Through dedicated wire connection, there is a one-to-one relationship between the destination and its source in the network. The source end is always unique to the destination end of the connection. But in the wireless network environment, there can be many wireless access points in proximity, as sources, to establish an upstream wireless access point network with the wireless networked device, as a destination.

Likewise, there are also many wireless portable devices in proximity, as sources, to establish peer-to-peer wireless network with the wireless networked device, as a destination. This type of dual mode or dual personality can only be done through manual configuration through the discovery and selection process by the wireless networked device, as a destination to the upstream wireless access point, and as a source to the portable devices.

When both wireless networked device and the upstream wireless access point are present in the portable device vicinity, the portable device can choose to connect to the wireless networked device in either peer-to-peer mode or access point network mode. Other portable devices in proximity can also connect to the wireless networked device in the same access point network mode. To describe the features of the present invention in more details refer now to following description in conjunction with the accompanying figures.

A system that utilizes the present invention can take the form of an implementation done entirely in hardware, entirely in software, or may be an implementation containing both hardware-based and software-based elements. In some embodiments, this disclosure may be implemented in software, which includes, but is not limited to, application software, firmware, resident software, program application code, microcode, etc.

Furthermore, the system and method of the present invention can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program or signals generated thereby for use by or in connection with the instruction execution system, apparatus, or device. Further a computer-readable medium includes the program instructions for performing the steps of the present invention. In one implementation, a computer-readable medium preferably carries a data processing or computer program product used in a processing apparatus which causes a computer to execute in accordance with the present invention. A software driver comprising instructions for execution of the present invention by one or more processing devices and stored on a computer-readable medium is also envisioned.

The medium can be an electronic, magnetic, optical, electromagnetic, infrared, or semiconductor system (or apparatus or device) or a propagation medium, or a signal tangibly embodied in a propagation medium at least temporarily stored in memory. Examples of a computer-readable medium include a semiconductor or solid state memory, magnetic tape, a removable computer diskette, a random access memory (RAM), a read-only memory (ROM), a rigid magnetic disk, and an optical disk. Current examples of optical disks include DVD, compact disk-read-only memory (CD-ROM), and compact disk-read/write (CD-R/W).

Figure 1:
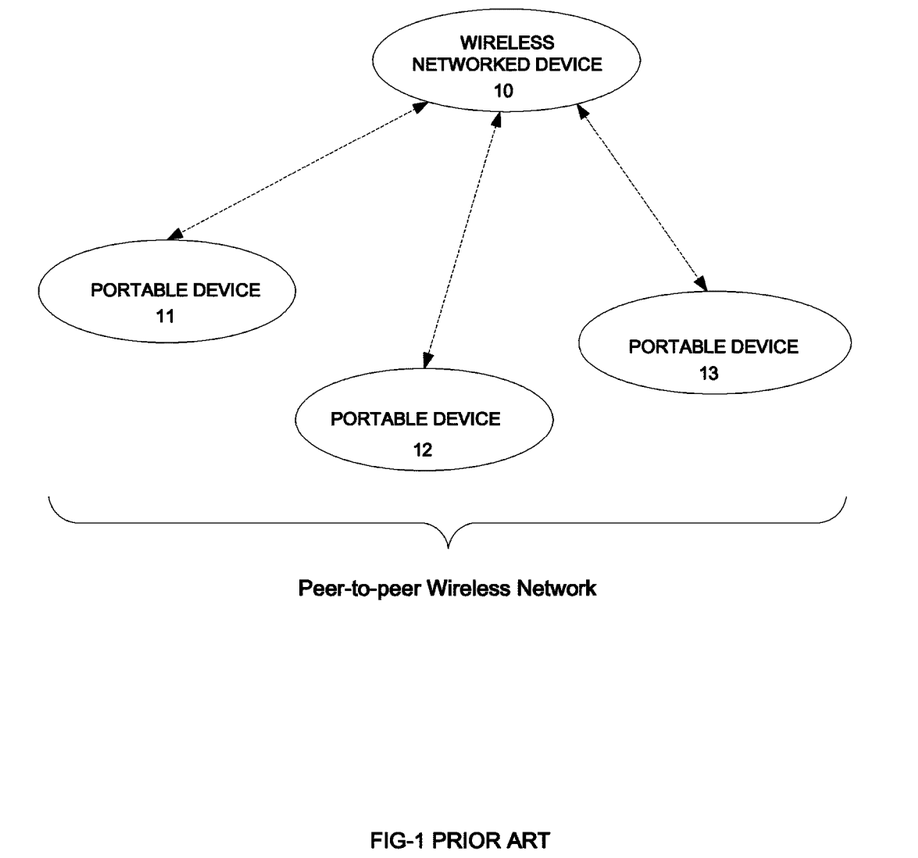
FIG. 1 illustrates a conventional peer-to-peer wireless network mode operation of wireless networked device.

As is shown in FIG. 1, a conventional peer-to-peer wireless network is formed around a wireless networked device 10. The portable devices, 11, 12 and 13, associate with the wireless networked device 10 following the configuration flow shown in FIG. 2. Initially, the user enters the graphical user interface (GUI) of the portable device via step 20. By scanning for wireless ID, the wireless networked device is discovered via step 21 on the GUI. The wireless networked device can then be selected from among other wireless devices broadcasting their IDs via step 22. The portable device IP address is manually configured via step 23 and then associated with the wireless networked device. The peer-to-peer wireless network is established via step 24. The functions and services of the wireless networked device are then available to the portable device on the peer-to-peer wireless network via step 25.

Figure 2:
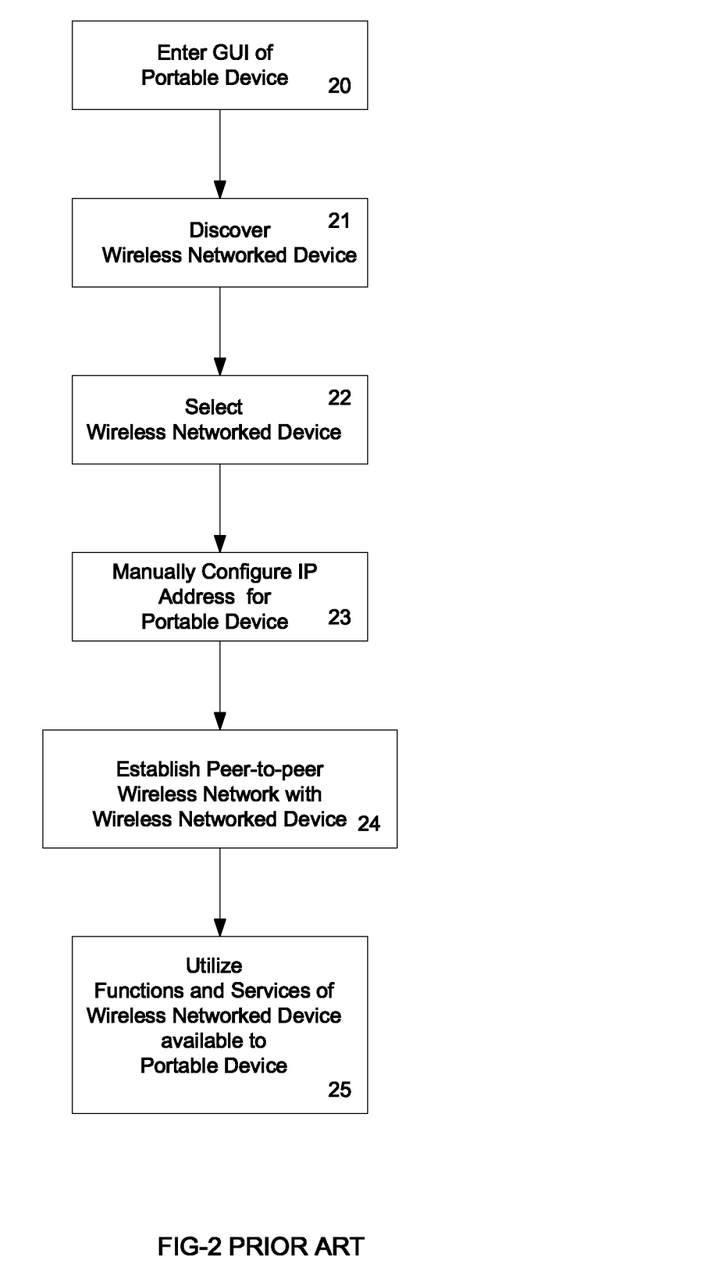
FIG. 2 illustrates a configuration flow of wireless networked device of FIG. 1 on a peer-to-peer wireless network.
Figure 3:
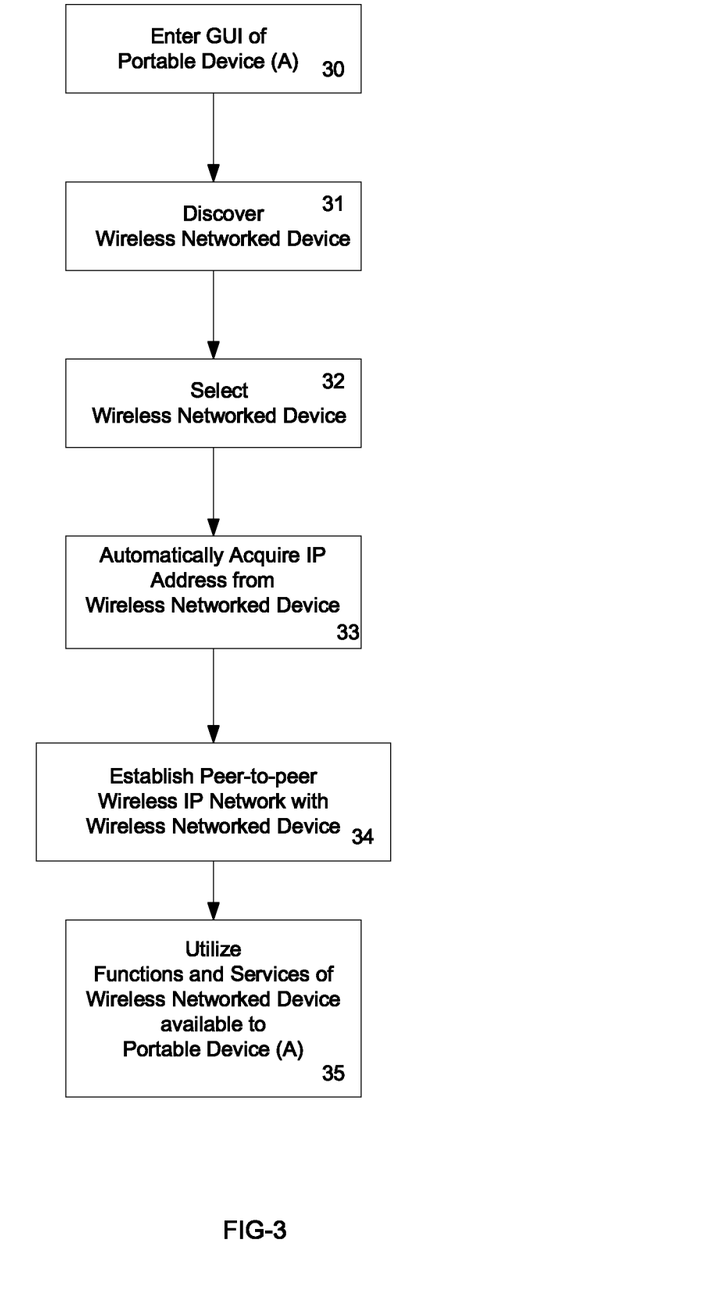
FIG. 3 illustrates an auto-configuration of wireless networked device on a peer-to-peer wireless network with portable device (A) in accordance with an embodiment.
Figure 4A:
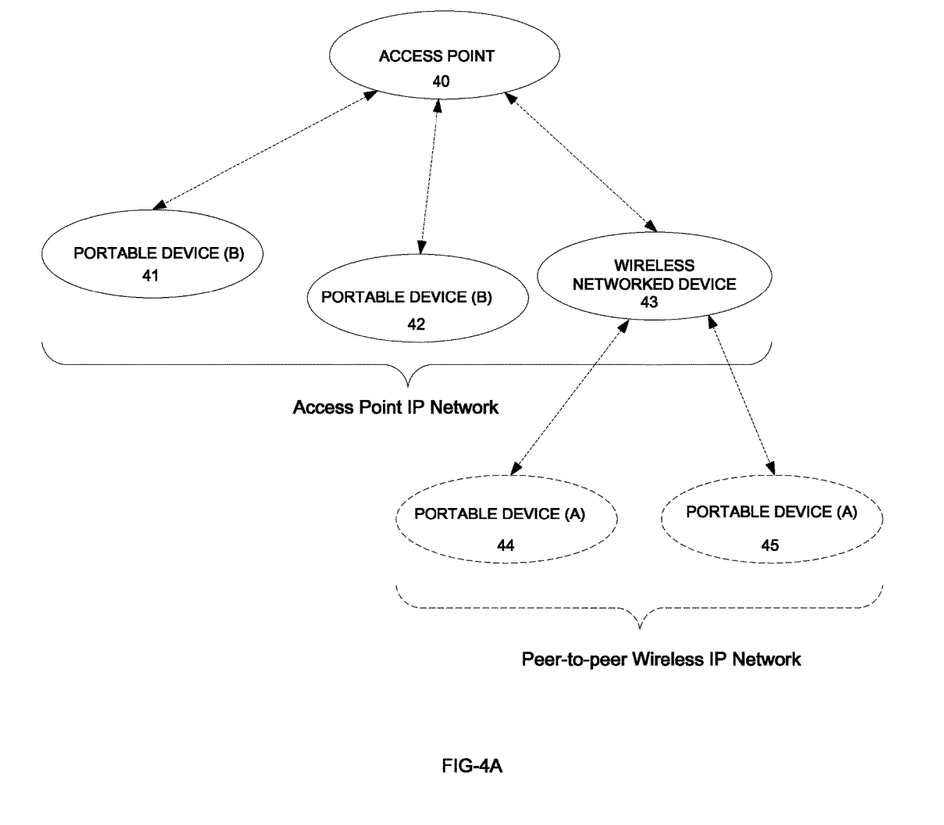
FIG. 4A illustrates an access point network mode operation of wireless networked device with portable device (B) in accordance with an embodiment.

The peer-to-peer wireless network as shown in FIG. 1 and FIG. 2 allows the portable device, once associated with the wireless networked device, to utilize the functions and services provided by the wireless networked device via step 25. In order to make the configuration more streamlined, a method and system in accordance with the present invention adds a dynamic host configuration protocol (DHCP) server function in the wireless networked device 43, as shown in FIG. 4A. Instead of manually configuring an IP address for portable device (A) 44 and 45, the wireless networked device 43 automatically assigns an IP address for the portable device 33, as shown in FIG. 3. The wireless networked device 43 not only makes auto-configuration possible on the class of portable device (A), but also allows multiple portable devices (A) to be able to effortlessly and seamlessly connect to the network. The network device 43 therefore transforms the peer-to-peer wireless network to a peer-to-peer wireless IP network. It enables the class of all portable devices (A) on this peer-to-peer wireless IP network to enjoy functions and services of the wireless networked device 35.

Figure 4B:
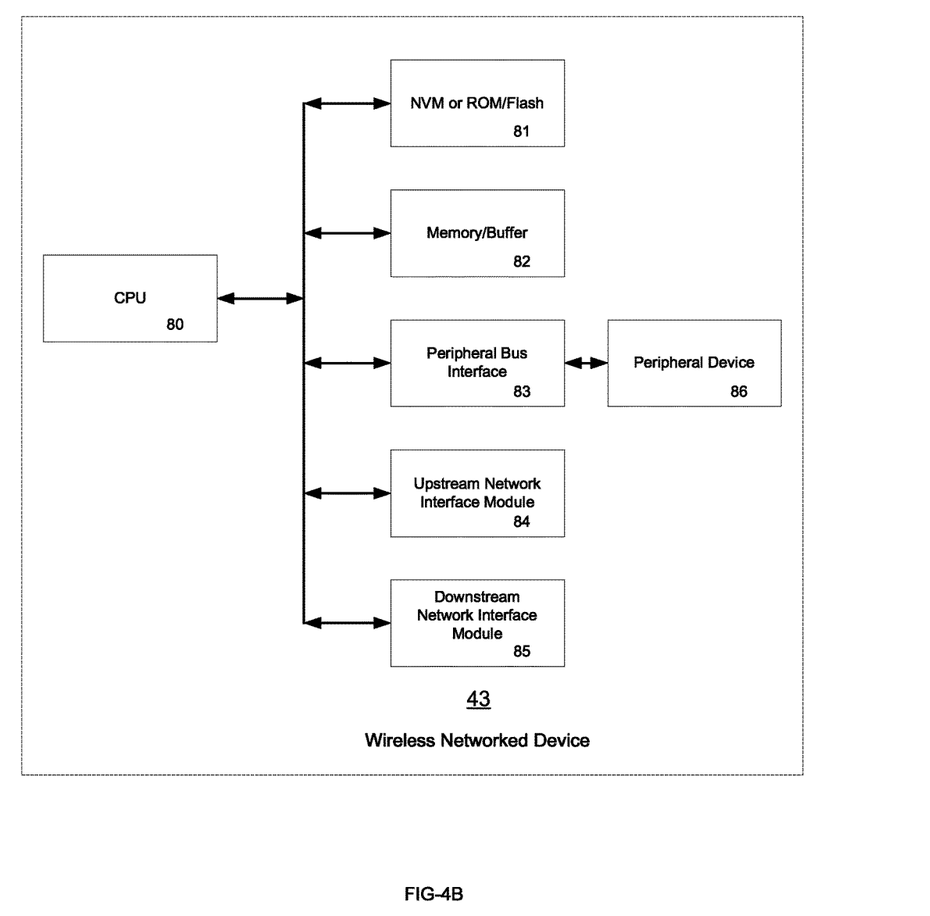
FIG. 4B is a block diagram of a wireless networked device in accordance with an embodiment.

FIG. 4B, is a block diagram of a first embodiment wireless networked device 43. The wireless networked device 43 includes a CPU 80, Nonvolatile memory (NVM) or ROM/Flash 81, memory/buffer 82, peripheral bus interface 83, peripheral device 86, upstream network interface module 84, and downstream network interface module 85.

The peripheral device 86 includes, but is not limited to storage, printer, scanner, display panel, keyboard, mouse, communication, network, video, and audio. The peripheral bus interface 83 includes, but is not limited to, USB, SD card, eMMC, HDMI, SATA, VGA, Ethernet, and PCIe.

Figure 4C:
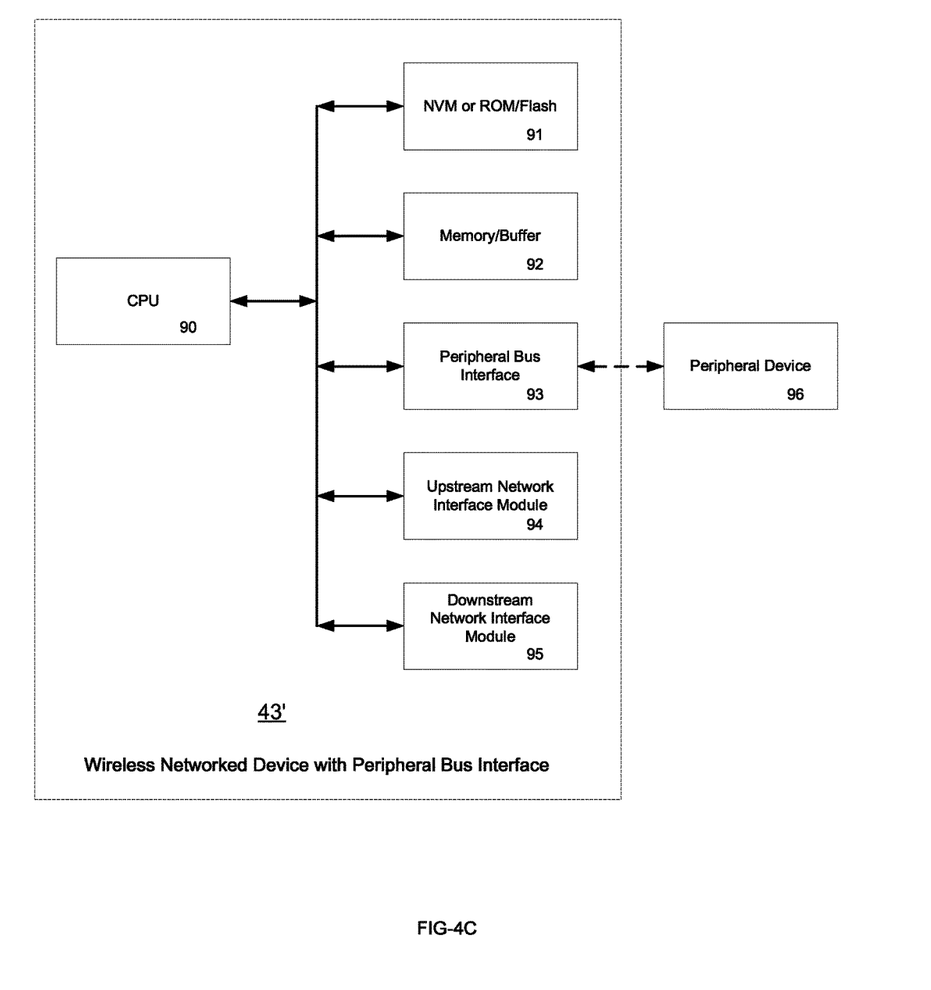
FIG. 4C is a block diagram of a wireless networked device adapter with peripheral bus interface in accordance with an embodiment.

FIG. 4C is a block diagram of a wireless networked device 43, that allows a peripheral device to the coupled external thereto. The wireless networked device 43' includes a CPU 90, a NVM or ROM/Flash 91, memory/buffer 92, peripheral bus interface 93, upstream network interface module 94, and downstream network interface module 95.

Once the wireless networked device is properly installed and configured with the proper peripheral device driver, the external peripheral device 96 can be added in the field by the user to make the wireless device adapter 97 more general purpose and adaptable.

The peripheral bus interface 93 includes, but is not limited to, USB, SD card, eMMC, HDMI, SATA, VGA, Ethernet, and PCIe. The peripheral device 96 includes, but is not limited to storage, printer, scanner, display panel, keyboard, mouse, communication, network, video, and audio.

As each portable device may only have one available wireless network port and service, this private peer-to-peer wireless network may become a handicap or barrier for the portable device to utilize both available services simultaneously provided by the networked server and the network enabled peripheral device. It is therefore, another purpose of this invention to add another mode of operation to the wireless networked device in addition to the above mentioned private peer-to-peer wireless network mode. The second mode of operation allows the wireless networked device to be able to join in the pre-existing network in proximity of the class of portable devices (B). The mode is therefore referred to as the access point network mode. During this mode, the proximity network access point serves both the class of portable devices (B) as well as the wireless networked device and other networked devices.

Configuring a Peer-to-Peer Wireless IP Network

Referring back to FIG. 4A, the wireless networked device 43 is associated with the portable device (A), 44 and 45, in a peer-to-peer wireless IP network following the configuration flow shown in FIG. 3. Initially, the user enters the graphical user interface (GUI) of the portable device (A) via step 30. By scanning for wireless ID, the wireless networked device is discovered on the GUI via step 31. The wireless networked device can then be selected from among other wireless devices broadcasting their IDs via step 32. The wireless networked device 43 automatically assigns IP address through its built-in DHCP server for the portable device (A) via step 33. The portable device (A) is then associated with the wireless networked device. The peer-to-peer wireless IP network is established via step 34. The ID of the discovered selected wireless networked device is therefore stored in a database of the portable device. The peer-to-peer wireless IP network relationship is then established. The functions and services of the wireless networked device are then available to the class of portable devices (A) on the network via step 35.

Configuring an Access Point IP Network

Figure 5:
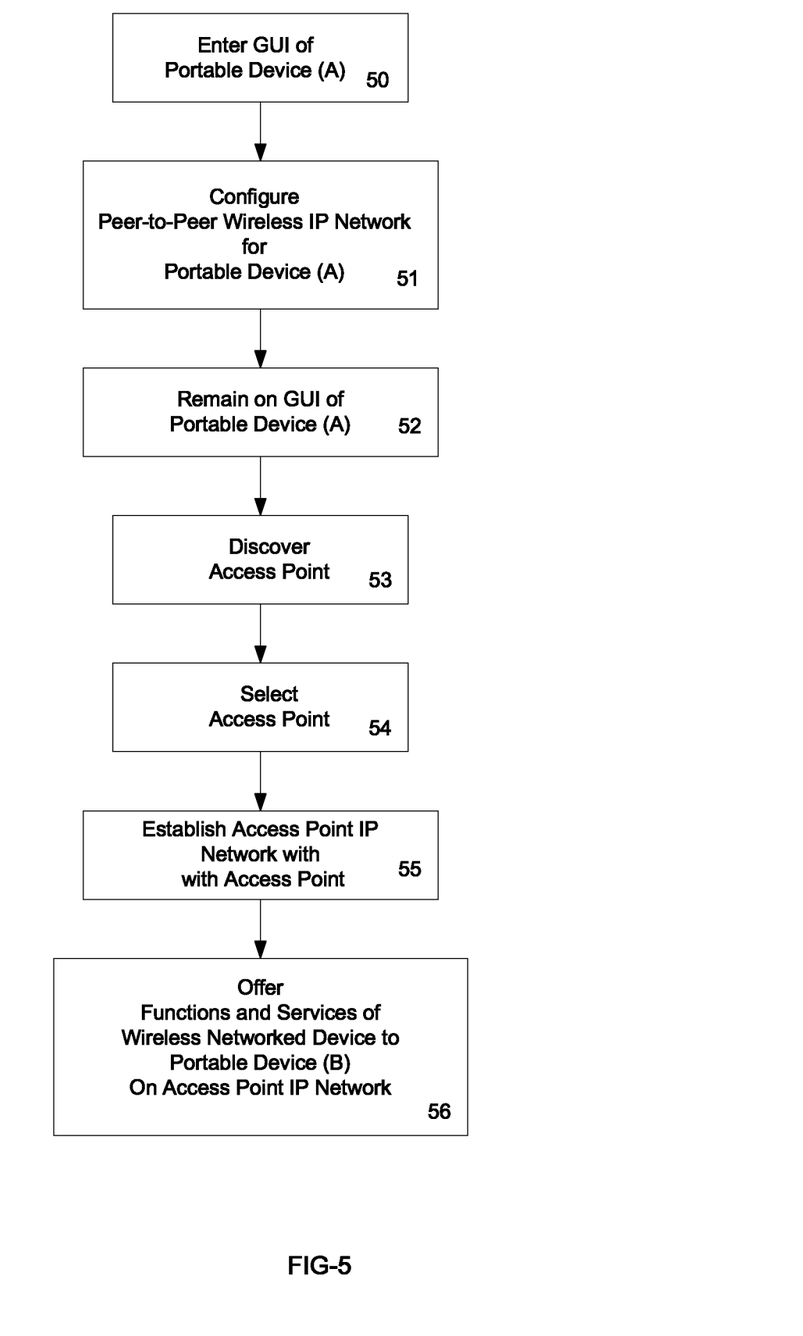
FIG. 5 illustrates a configuration of wireless networked device on an access point IP network in accordance with an embodiment.

Initially, the user enters the graphical user interface (GUI) of the portable device (A) via step 50, as shown in FIG. 5. A peer-to-peer wireless IP network for the portable device (A) via step 51 is configured, following the flow of FIG. 3.

By this point, the wireless networked device 43 is accessible by the portable device (A) 44 or 45. Through the same GUI of portable device (A) via step 52, the user scans for wireless ID, and discovers the desired access point via step 53. The upstream wireless access point can then be selected from among other wireless devices broadcasting their IDs via step 54. The upstream wireless access point 40 automatically assigns IP address through the built-in DHCP server for the wireless networked device 43. The wireless networked device is then associated with the upstream wireless access point via step 55. The ID of the configured and selected upstream wireless access point is stored in the database of the wireless networked device. The access point IP network relationship is then established. As is shown in FIG. 4, the upstream wireless access point 40 is associated with the wireless networked device 43 and portable devices (B) 41 and 42 in an access point IP network following the configuration flow shown in FIG. 5. The functions and services of the wireless networked device 43 are then available to the portable device (B), 41 and 42, on the same access point IP network via step 56.

As shown in FIG. 4A, if the wireless networked device has only one wireless channel to configure either downstream in peer-to-peer wireless IP network mode, or upstream in access point IP network mode, the availability of the functions and services of the wireless networked device is limited. On the one hand, the peer-to-peer wireless IP network mode offers more persistent and private bonding between the class of portable devices (A) and the wireless networked device.

On another hand, the access point IP network mode offers the class of portable devices (B) the functions and services, such as Internet and server access, available through the upstream wireless access point that may not be available through the wireless networked device. If the two modes are exclusive, then the class of portable device (A) that is associated with the wireless networked device has to constantly switch mode through configuration as the environment dictates.

Figure 6:
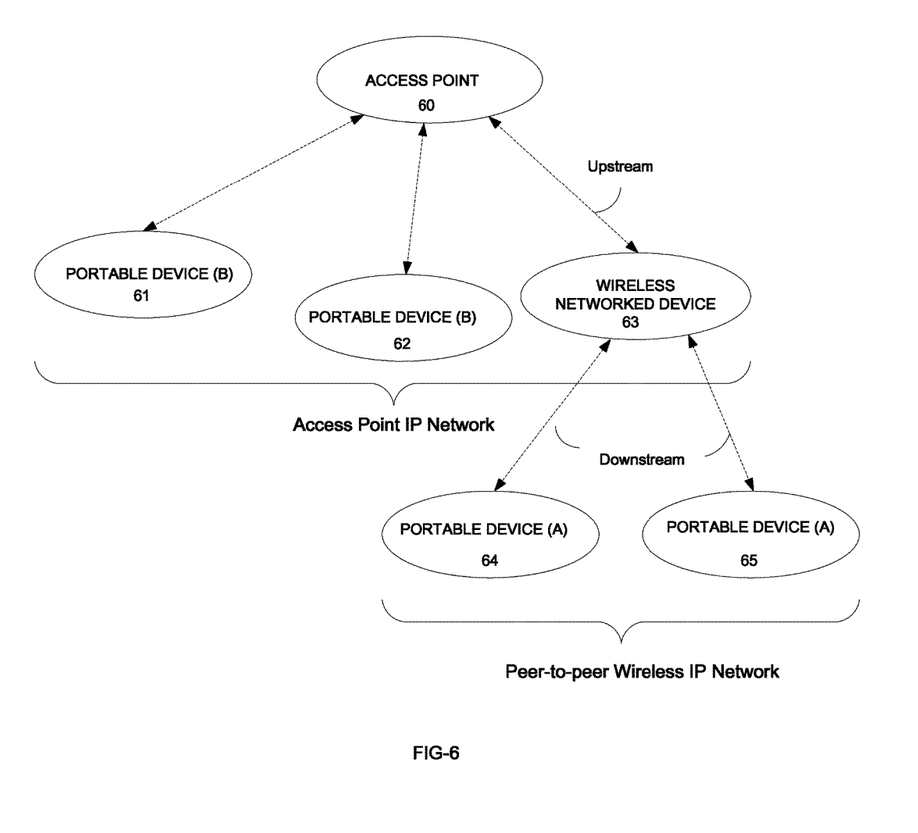
FIG. 6 illustrates a concurrent dual-mode operation of wireless networked device in accordance with an embodiment.

It is therefore another purpose of a method and system in accordance with the present invention to make the wireless networked device possible to have more than one wireless channel and allow concurrent upstream and downstream communication, as is shown in FIG. 6. The benefit allows the peer-to-peer wireless IP network mode and the access point IP network mode to function concurrently. The portable device (A), 64 and 65, that has been configured once under the peer-to-peer wireless IP network can effortlessly and seamlessly utilize the functions and services of the wireless networked device 63.

As soon as the wireless networked device 63 joins the upstream wireless access point 60 in the access point IP network, the portable devices (B), 61 and 62, automatically can utilize the functions and services of the wireless networked device 63, through the upstream wireless access point 60, without further configuration. In the mean time, portable device (B), 61 and 62, can still enjoy the functions and services available from the upstream wireless access point 60. The portable device (A), 64 and 65, can also enjoy the functions and services available from the upstream wireless access point 60, through the upstream routing of the wireless network device 63.

Figure 7:
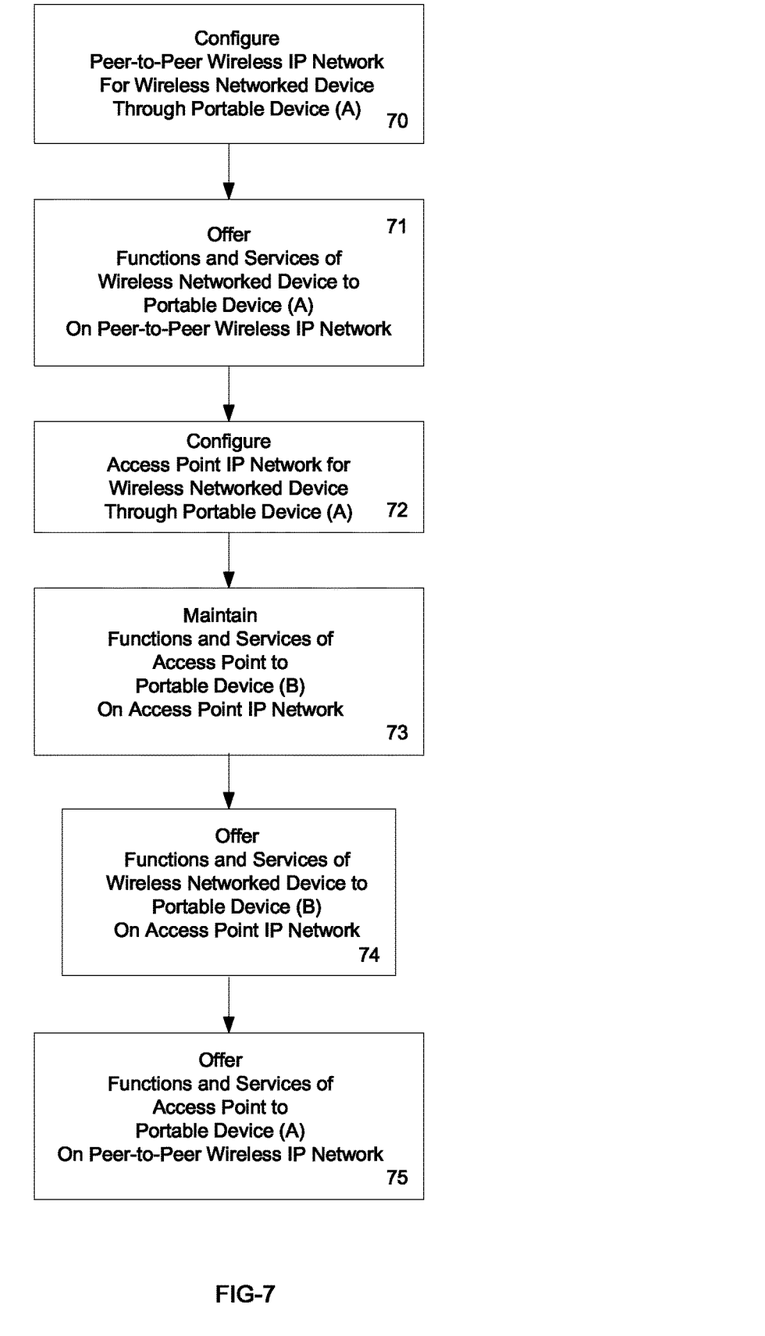
FIG. 7 illustrates a concurrent dual-mode configuration flow of wireless networked device on peer-to-peer wireless network and access point IP network in accordance with an embodiment.

The configuration flow of the concurrent dual-mode wireless networked device on both the peer-to-peer wireless IP network and the access point IP network is shown in FIG. 7. The first level of downstream peer-to-peer wireless IP network configuration of the wireless networked device via step 70 is shown in more detail in FIG. 3. As a result, functions and services of the wireless networked device are offered to the portable device (A) on the peer-to-peer wireless IP network via step 71. The second level of upstream access point IP network configuration of the wireless networked device via step 72 is shown in more detail in FIG. 5. After the access point IP network is configured, the functions and services of the upstream wireless access point to the portable device (B) are still maintained via step 73.

Because the wireless networked device 63 is able to function concurrently both upstream and downstream, The functions and services of the wireless networked device are available to the portable device (B) on the access point IP network via step 74. In the mean time, the functions and services of the upstream wireless access point are also available to the portable device (A) on the peer-to-peer wireless IP network via step 75, through the multi-channel routing capability of the wireless networked device.

Features and Advantages

A unique ID for discovery, selection and configuration purpose.

One mode of operation is through a peer-to-peer wireless IP network.

Wireless network can be discovered, selected and configured through the graphical user interface (GUI) of a portable device (A) to establish a peer-to-peer wireless IP network with the class of portable devices (A).

The ID of the configured and selected wireless networked device is stored in the database of the wireless networked device.

Has a built-in dynamic host configuration protocol (DHCP) server to automatically allocate an IP address to the connected portable device (A).

Allows multiple portable devices (A) to associate with the wireless networked device in the peer-to-peer wireless IP network. All the portable devices (A) in this class are able to enjoy the functions and services available on the wireless networked device.

Another mode of operation is through an access point IP network.

The upstream wireless access point can be discovered, selected and configured through the GUI of the portable device (A) in the previously established peer-to-peer wireless IP network.

The wireless networked device is then associated with the upstream wireless access point to join the access point IP network. All network devices, including the portable devices (B) in this class are able to enjoy the functions and services available on the wireless networked device.

The ID of the configured and selected upstream wireless access point is stored in the database of the wireless networked device.

The wireless networked device has more than one wireless communication channel that can function concurrently upstream or down stream.

The wireless networked device connects downstream in the peer-to-peer wireless IP network mode and upstream in the access point IP network mode. The two modes of operation can function concurrently.

Able to connect to two classes of portable devices (A) and (B) through concurrent dual-mode operation.

The wireless networked device further serves as a router to the downstream class of portable devices (A) in the peer-to-peer IP network to provide access to the upstream wireless access point in the upstream access point IP network.

All the portable devices (A) in the class of peer-to-peer IP network are able to enjoy the functions and services available through the upstream wireless access point on the access point IP network.

Once the portable device (A) in the class of peer-to-peer IP network is configured to associate with the wireless networked device, it is able to automatically connect to one of the previously configured upstream wireless access points in the database. No further configuration is required. It therefore allows the portable devices (A) in the class of peer-to-peer IP network to effortlessly and seamlessly connect to the upstream wireless access point.

The peer-to-peer wireless network mode and the access point network mode of operation can be exclusive or concurrent.

The wireless networked device includes a CPU, NVM or ROM/Flash, memory/buffer, peripheral bus interface, peripheral device, upstream network interface module, and downstream network interface module.

The peripheral device includes, but is not limited to, storage, printer, scanner, display panel, keyboard, mouse, communication, network, video, and audio. The peripheral bus interface includes, but is not limited to, USB, SD card, eMMC, HDMI, SATA, VGA, Ethernet, and PCIe.

The wireless networked device includes a CPU, NVM or ROM/Flash, memory/buffer, peripheral bus interface, upstream network interface module, and downstream network interface module. Once the wireless networked device is property installed and configured with the proper peripheral device driver, the peripheral device can be added in the field by the user to make the wireless device adapter more general purpose and adaptable.

The peripheral bus interface includes, but is not limited to, USB, SD card, eMMC, HDMI, SATA, VGA, Ethernet, and PCIe. The peripheral device includes, but it is not limited to storage, printer, scanner, display panel, keyboard, mouse, communication, network, video, and audio.

Although a method and system in accordance with the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A wireless networked device comprising:

a central processing unit (CPU) executing instructions comprising a configuration function stored in a non-volatile memory (NVM);

a bus coupled to the CPU;

a memory/buffer coupled to the bus;

a peripheral bus interface coupled to the bus;

an upstream network module coupled to the bus:

a downstream network module coupled to the bus; and the NVM coupled to the bus, wherein the NVM stores the configuration function with multi-channel routing capability, wherein the configuration function establishes a first network with a downstream portable device to enable the downstream portable device coupled to the first network to utilize functions of the wireless networked device, wherein the configuration function simultaneously couples to a second network with at least one access point to simultaneously enable both a plurality of upstream portable devices coupled to the second network to utilize functions of the wireless networked device and the downstream portable device to utilize functions of the at least one access point via the wireless networked device, wherein both a peer to peer IP wireless network and an access point (AP) wireless network are initially configured for the wireless networked device using the downstream portable device and information of the peer to peer IP wireless network and the AP wireless network as configured are stored in a database of the wireless network device.

2. The wireless networked device of claim 1 wherein the configuration function comprises a dynamic host configuration service function.

3. The wireless networked device of claim 1 further comprising:
a peripheral device coupled to the peripheral bus interface.

4. The wireless networked device of claim 3 wherein the configuration function is utilized in the first network which is the peer to peer wireless network and in the second network which is the access point (AP) wireless network.

5. An autoconfiguration method for wireless networks, the method comprising:
automatically acquiring an IP address utilizing a configuration function of a wireless networked device by one of a first set of portable devices to establish a peer to peer IP wireless network with the wireless networked device;
discovering and selecting an upstream wireless access point by the one of the first set of portable devices to associate the wireless networked device with an access point (AP) wireless network via the configuration function, wherein the AP wireless network includes the upstream wireless access point and a second set of portable devices, wherein both the peer to peer IP wireless network and the AP wireless network are initially configured for the wireless networked device using the one of the first set of portable devices and information of the peer to peer IP wireless network and the AP wireless network as configured are stored in a database of the wireless network device; and
utilizing function and services of the wireless networked device by the second set of portable devices and simultaneously utilizing function and services of both the wireless networked device and the upstream wireless access point by the first set of portable devices.

6. The autoconfiguration method of claim 5 further comprising utilizing a graphical user interface of the one of the first set of portable devices to discover and to select the wireless networked device from among one or more wireless networked devices.

7. The autoconfiguration method of claim 6, wherein the IP address of the discovered and selected wireless networked device is stored in the first set of portable devices.

8. The autoconfiguration method of claim 7, wherein the first set of portable devices comprises a plurality of portable devices downstream from the wireless networked device and the second set of portable devices comprises a plurality of portable devices upstream from the wireless networked device.

9. The autoconfiguration method of claim 5, further comprising:
automatically assigning the IP address via the configuration function within the wireless networked device to associate the wireless networked device with the AP wireless network.

10. The autoconfiguration method of claim 9, wherein the wireless networked device is configured concurrently in the peer to peer IP wireless network and in the AP wireless network.

11. The autoconfiguration method of claim 5, wherein the wireless networked device comprises:
a central processing unit (CPU);
a bus coupled to the CPU, and
a memory/buffer coupled to the bus;
a peripheral bus interface coupled to the bus;
an upstream network module coupled to the bus;
a downstream network module coupled to the bus; and
a nonvolatile memory (NVM) coupled to the bus, wherein the NVM includes the configuration function with multi-channel routing capability, wherein the configuration function establishes the peer to peer IP wireless network with one of the first set of portable devices to enable the one of the first set of portable devices coupled to the peer to peer IP wireless network to utilize functions of the wireless networked device, wherein the configuration function simultaneously couples to the AP wireless network with the upstream wireless access point to simultaneously enable both the second set of portable devices coupled to the AP wireless network to utilize functions of the wireless networked device and the one of the first set of portable devices to utilize functions of the at least one access point via the wireless networked device.

12. The autoconfiguration method of claim 11, wherein the wireless networked device includes a peripheral device coupled to the peripheral bus interface.

13. The autoconfiguration method of claim 11, wherein the configuration function comprises a dynamic host configuration service function.

* * * * *